United States Patent Office 2,724,266
Patented Nov. 22, 1955

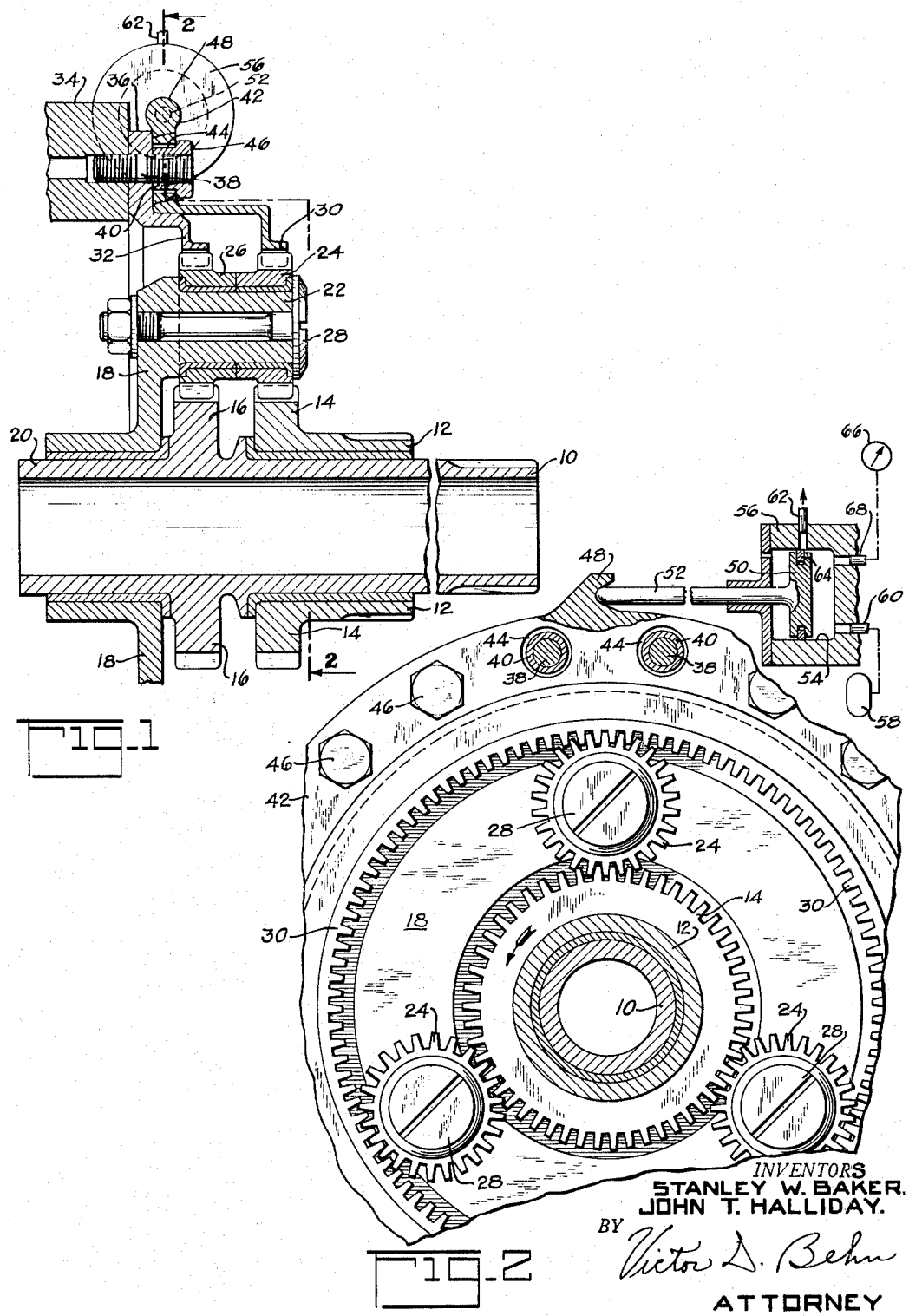

2,724,266

TORQUE MEASURING DEVICE

Stanley W. Baker, Hackensack, and John T. Halliday, Midland Park, N. J., assignors to Curtiss-Wright Corporation, a corporation of Delaware Application September 30, 1950, Serial No. 187,748

5 Claims. (Cl. 73—136)

This invention relates to means for measuring the torque transmitted from one rotating shaft to another and is particularly directed to such torque measuring means for shafts drivably connected together for rotation in the same direction at the same speed, that is, connected together for rotation in the same direction at 1:1 speed ratio.

In the case of a transmission drivably connecting one shaft to another at other than a 1:1 speed ratio, some fixed member of said transmission is subject to a reaction torque. The reaction torque acting on such a fixed reaction member is proportional to the torque transmitted by the rotating shafts. As is known, measurement of the torque of such a fixed reaction member provides a simple and reliable arrangement for determining the magnitude of the torque transmitted by the transmission. Where, however a pair of shafts are connected together for rotation in the same direction at a 1:1 speed ratio there generally is no such fixed reaction member. It is an object of the present invention to provide a novel arrangement for drivably connecting a pair of shafts for rotation in the same direction at 1:1 speed ratio such that there is provided a fixed reaction member which is subjected to a torque proportional to the torque transmitted whereby said transmitted torque can be determined by measuring the torque on said fixed reaction member.

Other objects of the invention will become apparent upon reading the annexed detailed description in connection with the drawing in which;

Figure 1 is an axial sectional view through a transmission embodying the invention; and Figure 2 is a view taken along line 2—2 of Figure 1.

Referring to the drawing, co-axial shafts 10 and 12 are drivably connected together for rotation in the same direction at the same speed (1:1 speed ratio). Such a driving connection normally does not include a relatively fixed torque reaction member.

As illustrated, the driving connection between the shafts 10 and 12 includes sun gears 14 and 16 each co-axially connected to the shafts 12 and 10 respectively. The sun gears 14 and 16 have an equal number of teeth and their pitch circles are co-axial and have the same diameter. A planet carrier 18 is piloted about an extension 20 of the shaft 12 for rotation relative thereto about the axis of said shaft. The planet carrier 18 has a plurality of circumferentially-spaced studs 22 projecting axially therefrom, each of said studs having a pair of side-by-side planet pinions 24 and 26 journaled thereon. The pinions 24 and 26 of each pair are identical and three pairs of such pinions are illustrated (see Figure 2). The pinions 24 are disposed in meshing engagement with the sun gear 14 and the pinions 26 are disposed in meshing engagement with the sun gear 16. Each pair of pinions 24 and 26 is maintained in position on its stud 22 by the head of a bolt 28 extending through said stud.

An internal gear 30 is co-axially disposed about the sun gear 14, said internal gear meshing with the pinions 24. Similarly an internal gear 32 is co-axially disposed about the sun gear 16 said internal gear 32 meshing with the pinions 26. The internal gears 30 and 32 have an equal number of teeth and their pitch circles are co-axial and have the same diameter. As hereinafter described the internal gears 30 and 32 are secured against rotation to a fixed housing illustrated in part at 34.

With the aforedescribed transmission or gearing connecting the shafts 10 and 12, said shafts are drivably connected for rotation in the same direction at 1:1 speed ratio regardless of which of said shafts is the driven shaft. When torque is transmitted from one of said shafts to the other, the internal gears 30 and 32 are each subject to a reaction torque proportional to the torque transmitted, the reaction torque on said internal gears being equal but being oppositely directed about the axis of the shafts, whereby the algebraic sum of the torques on the reaction gears 30 and 32 is zero. Thus the internal gears 30 and 32 comprise fixed reaction members of the gearing drivably connecting the shafts 10 and 12 and therefore the magnitude of the torque transmitted can be determined by measuring the reaction torque of either of said internal gears.

The internal gear 32 has an annular rim 36 which is rigidly secured against rotation to the fixed housing 34 by means of threaded studs 38 projecting from said housing through said annular rim. The annular rim 36 is rigidly clamped against the fixed housing 34 by sleeves 40 threaded against said rim on the projecting ends of the studs 38. The internal gear 30 also has an annular rim 42 through which the studs 38 project. The sleeves 40, threaded on the studs 38 against the rim 36, project through the rim 42 in clearance relation thereto, said clearance being indicated at 44. The gear rim 42 is held loosely in position on the studs 38 by the enlarged heads 46 of the sleeves 40. With this arrangement the internal gear 32 is rigidly clamped to the fixed housing 34 but the internal gear 30 can have small rotational movements about the axis of the shafts 10 and 12 as limited by the clearance 44.

Assuming, for example, that the shafts 10 and 12 rotate counterclockwise (as viewed in Figure 2) and that shaft 12 is the driving shaft, then the reaction torque on the internal gear 30 is counterclockwise. In order to restrain rotation of the internal gear 30 in response to said reaction torque, the rim 40 of said gear is provided with an ear 48 which is operatively connected to a piston 50 by a piston rod 52 extending tangentially from said rim. The piston 50 is slidable in a cylindrical bore 54 formed in a fixed member 56 which is rigidly carried by the housing 34. A pump 58, which may be drivably connected to the shafts 10 and 12, supplies a liquid under pressure to the bore 54 behind the piston 50 through a passage 60. A drain passage 62 extends through the member 56 into the bore 54 and the piston 50 has a seal ring 64 arranged to cooperate with said drain passage to control the extent to which said passage is opened.

With the arrangement illustrated, when the system is stabilized the torque reaction force acting on the piston 50 through the piston rod 52 is balanced by the opposing fluid pressure force acting on said piston. Then, for example, upon an increase in the torque acting on the reaction gear 30, the torque reaction force on the piston 50 increases proportionally to momentarily unbalance the forces acting on said piston but as soon as said forces are slightly unbalanced by said increase in the torque reaction force the piston 50 moves slightly to the right (as viewed in Figure 2) until the closing adjustment of the drain passage 62 is sufficient to increase the fluid pressure on said piston to a value which balances the torque reaction force. Similarly a decrease in the torque reaction force is accomplished by a slight but simultaneous movement of the piston 50 to the left (Figure 2) to increase the extent to which the drain passage 62 is open thereby effecting a simultaneous decrease in the fluid pressure force acting against the piston so as to balance the opposing torque responsive force. Thus the piston 50 automatically controls the drain passage 62 to vary the magnitude of the fluid pressure against said piston so that said pressure always balances the torque responsive force on said piston. The range of floating movement of the internal reaction gear 30 is small since only a small movement of the piston 50 provides a large change in the fluid pressure acting thereon. Therefore, as illustrated, the clearance 44 need not be large.

Because the piston 50 automatically maintains the fluid pressure force acting thereagainst equal to the opposing torque reaction force transmitted from the gear 30 through the piston rod 52 and because the reaction torque on the gear 30 is always proportional to the torque transmitted, the fluid pressure against the piston 50 is always proportional to said transmitted torque. Accordingly a fluid pressure measuring device 66 may be connected to the bore 54 through a passage 68 and calibrated to read directly the magnitude of the transmitted torque. Obviously the torque acting on the reaction gear 32 is also proportional to the torque transmitted so that said reaction gear 32, instead of the reaction gear 30, could be used for measuring the torque transmitter.

With the structure described, a simple and reliable device for measuring the torque transmitted from one rotating shaft to another is provided notwithstanding the fact that said shafts rotate in the same direction at 1:1 speed ratio.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. In combination; first and second co-axial shafts; gearing means drivably connecting said shafts for rotation in the same direction at 1:1 speed ratio; said gearing means including a plurality of members each subject to a reaction torque proportional to the torque transmitted by said shafts, the algebraic sum of the reaction torques acting on said members being equal to zero; a fixed structure and means for restraining said reaction members against rotation by connecting said reaction members to said fixed structure so that the net torque transmitted to said fixed structure by said members is equal to zero, said last-named means including measuring means responsive to changes in the reaction torque acting on at least one of said members.

2. In combination; first and second co-axial shafts; gearing means drivably connecting said shafts for rotation in the same direction at 1:1 speed ratio; said gearing means including a pair of reaction members each subject to equal reaction torque proportional to the reaction torque transmitted by said shafts, the reaction torque acting on said reaction members urging said reaction members in opposite rotative directions about the axis of said shafts; a fixed structure; and means connecting said reaction members to said fixed structure for restraining said reaction members against rotation, said last named means including a piston operatively connected to one of said reaction members and means for supplying a fluid under pressure against said piston for balancing the reaction torque force exerted by said one reaction member against said piston.

3. In combination; first and second co-axial shafts; a pair of sun gears, one for and co-axially connected to each of said shafts; a pair of planet gears, one for and meshing with each of said sun gears; a pair of co-axial reaction gears, one for and meshing with each of said planet gears; the number of teeth and the pitch circle diameter of each sun gear, planet gear and reaction gear being equal to that of the other sun gear, planet gear and reaction gear respectively; and measuring means responsive to changes in the reaction torque acting on at least one of said reaction gears.

4. In combination; first and second co-axial shafts; a pair of sun gears, one for and co-axially connected to each of said shafts; a pair of planet gears, one for and meshing with each of said sun gears; a pair of co-axial reaction gears, one for and meshing with each of said planet gears; the number of teeth and the pitch circle diameter of each sun gear, planet gear and reaction gear being equal to that of the other sun gear, planet gear and reaction gear respectively; a piston operatively connected to one of said reaction gears; and means for supplying a fluid under pressure against said piston for balancing the reaction torque force exerted by the associated reaction gear against said piston.

5. In combination; first and second co-axial shafts; a pair of sun gears, one for and co-axially connected to each of said shafts; a pair of planet gears, one for and meshing with each of said sun gears; a pair of co-axial reaction gears, one for and meshing with each of said planet gears; the number of teeth and the pitch circle diameter of each sun gear, planet gear and reaction gear being equal to that of the other sun gear, planet gear and reaction gear respectively; a piston operatively connected to one of said reaction gears; means for supplying a fluid under pressure against said piston for opposing the torque reaction force exerted by the associated reaction gear against said piston; and means controlled by movements of said piston for regulating the magnitude of said fluid pressure to balance said torque reaction force.

References Cited in the file of this patent
UNITED STATES PATENTS

| | | |
|---|---|---|
| 1,994,879 | Tweit | Mar. 19, 1935 |
| 2,154,489 | Buck | Apr. 18, 1939 |
| 2,289,285 | Chilton | July 7, 1942 |
| 2,518,708 | Moore | Aug. 15, 1950 |
| 2,529,330 | Double | Nov. 7, 1950 |